United States Patent
Dixon et al.

(10) Patent No.: US 9,449,239 B2
(45) Date of Patent: Sep. 20, 2016

(54) CREDIT CARD AUTO-FILL

(71) Applicant: Apple Inc., Cupertino, CA (US)

(72) Inventors: Ryan S. Dixon, Mountain View, CA (US); Ueli Meier, Santa Cruz, CA (US); Karl M. Groethe, San Francisco, CA (US); Jerome R. Bellegarda, Saratoga, CA (US); Giulia M. Pagallo, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 158 days.

(21) Appl. No.: 14/292,763

(22) Filed: May 30, 2014

(65) Prior Publication Data

US 2015/0347859 A1    Dec. 3, 2015

(51) Int. Cl.
| | |
|---|---|
| *G06K 9/18* | (2006.01) |
| *G06K 9/20* | (2006.01) |
| *G06K 9/22* | (2006.01) |
| *G06K 9/32* | (2006.01) |
| *G06K 9/72* | (2006.01) |

(52) U.S. Cl.
CPC ............ *G06K 9/186* (2013.01); *G06K 9/2081* (2013.01); *G06K 9/228* (2013.01); *G06K 9/325* (2013.01); *G06K 9/72* (2013.01)

(58) Field of Classification Search
None
See application file for complete search history.

(56) References Cited

U.S. PATENT DOCUMENTS

| | | |
|---|---|---|
| 4,845,770 A | 7/1989 | Koshida |
| 5,500,905 A | 3/1996 | Martin |
| 6,520,407 B1 | 2/2003 | Nieswand |
| 7,499,588 B2 | 3/2009 | Jacobs |
| 8,118,216 B2 | 2/2012 | Hoch |
| 8,493,513 B2 | 7/2013 | Sullivan |
| 8,553,109 B2 | 10/2013 | Plowman |
| 8,577,145 B2 | 11/2013 | Panetta |
| 8,620,058 B2 | 12/2013 | Nepomniachtchi |
| 8,724,924 B2 | 5/2014 | Nepomniachtchi |
| 8,805,125 B1 * | 8/2014 | Kumar ............... 382/309 |
| 9,270,899 B1 | 2/2016 | Ivanchenko |

(Continued)

OTHER PUBLICATIONS

K. Datta, "Credit Card Processing Using Cell Phone Images," Stanford University, 2011-2012. Retreived from: https://stacks.stanford.edu/file/druid:yj296hj2790/Datta_Credit_card_processing_using_cell_phone.pdf.*

(Continued)

*Primary Examiner* — Matthew Bella
*Assistant Examiner* — Soo Shin
(74) *Attorney, Agent, or Firm* — Blank Rome LLP

(57) ABSTRACT

Differing embodiments of this disclosure may employ one or all of the several techniques described herein to perform credit card recognition using electronic devices with integrated cameras. According to some embodiments, the credit card recognition process may comprise: obtaining a first representation of a first image, wherein the first representation comprises a first plurality of pixels; identifying a first credit card region within the first representation; extracting a first plurality of sub-regions from within the identified first credit card region, wherein a first sub-region comprises a credit card number, wherein a second sub-region comprises an expiration date, and wherein a third sub-region comprises a card holder name; generating a predicted character sequence for the first, second, and third sub-regions; and validating the predicted character sequences for at least the first, second, and third sub-regions using various credit card-related heuristics, e.g., expected character sequence length, expected character sequence format, and checksums.

17 Claims, 11 Drawing Sheets

(56) References Cited

U.S. PATENT DOCUMENTS

| | | |
|---|---|---|
| 2007/0223582 A1 | 9/2007 | Borer |
| 2008/0310721 A1 | 12/2008 | Yang |
| 2009/0284613 A1 | 11/2009 | Kim |
| 2010/0008535 A1 | 1/2010 | Abulafia |
| 2012/0143760 A1* | 6/2012 | Abulafia ............... G06K 9/2054 705/44 |
| 2012/0185393 A1 | 7/2012 | Atsmon |
| 2012/0284185 A1 | 11/2012 | Mettler |
| 2013/0004076 A1* | 1/2013 | Koo ........................ G06K 9/228 382/176 |
| 2013/0085935 A1* | 4/2013 | Nepomniachtchi .. G06Q 20/322 705/40 |
| 2013/0148862 A1* | 6/2013 | Roach ................... G06Q 40/02 382/112 |
| 2013/0202185 A1 | 8/2013 | Irwin |
| 2013/0265311 A1 | 10/2013 | Na |
| 2014/0052636 A1* | 2/2014 | Mattes ................. G06Q 20/409 705/44 |
| 2014/0143143 A1* | 5/2014 | Fasoli .................. G06Q 20/023 705/44 |
| 2014/0192210 A1 | 7/2014 | Gervautz |
| 2015/0006362 A1* | 1/2015 | Mitchell ................. G06K 7/10 705/39 |
| 2015/0347859 A1 | 12/2015 | Dixon |
| 2015/0347860 A1* | 12/2015 | Meier .................... G06K 9/186 382/140 |
| 2015/0347861 A1* | 12/2015 | Doepke ................... G06K 9/46 382/199 |

OTHER PUBLICATIONS

Bengio et al., Globally Trained Handwritten Word Recognizer using Spatial Representation Convolutional Neural Networks and Hidden Markov Models, 1994, Advances in Neural Information Processing Systems, pp. 937-944.

Deng et al., Error-Correcting Output Coding for the Convolutional Neural Network for Optical Character Recognition, 2009, 10th International Conference on Document Analysis and Recognition, pp. 581-585.

Ciresan, et al., "Multi-column Deep Nueral Networks for Image Classification," IDSIA, Technical Report No. IDSIA-04-12, Feb. 2012, 20 pages.

Graves, "Supervised Sequence Labelling with Recurrent Neural Networks," vol. 385 of Studies in Computational Intelligence, Springer, 2012, 124 pages.

Graves, et. al., "Connectionist Temporal Classification: Labelling Unsegmented Sequence Data with Recurrent Neural Networks," IDSIA, 2006, 8 pages.

LeCun, et al., "Gradient-Based Learning Applied to Document Recognition," Proceedings of the IEEE, 86(Nov. 11, 1998, 46 pages.

Pascanu, et al., "On the difficulty of training Recurrent Neural Networks," In ICML (3), 2013, 12 pages.

Patrice Y. Simard, Dave Steinkraus, John Platt, "Best Practices for Convolutional Neural Networks Applied to Visual Document Analysis," International Conference on Document Analysis and Recognition (ICDAR), IEEE Computer Society, Los Alamitos, pp. 958-962, 2003.

Schambach, et al., "Stabilize Sequence Learning with Recurrent Neural Networks by Forced Alignment," 2013 12th International Conference on Document Analysis and Recognition (ICDAR), IEEE Computer Society, pp. 1300-1304, 2013.

Graves, et al., "Speech recognition with deep recurrent neural networks," IEEE Conference on Acoustics, Speech and Signal Process (ICASSP), 2013.

He, Pan, et al., "Reading scene text in deep convolutional sequences," arXiv preprint arXiv:1506.04395 (2015).

Shi, Baoguang, et al., "An end-to-end trainable neural network for image-based sequence recognition and its application to scene text recognition," arXiv prepring arXiv:1507.05717 (2015).

Song, William, and Jim Cai, End-to-End Deep Neural Network for Automatic Speech Recognition, 2015.

Su, Bolan, and Shijian Lu, "Accurate scene text recognition based on recurrent neural network," Computer Vision—ACCV 2014, Springer International Publishing, pp. 35-48.

Su, Bolan, et al., "Segmented handwritten text recognition with recurrent neural network classifiers," 13th International Conference on Document Analysis and Recognition (ICDAR), IEEE, 2015.

Yousfi, Sonia, et al., "Deep learning and recurrent connectionist-based approaches for Arabic text recognition in videos," 13th International Conference on Document Analysis and Recognition (ICDAR), IEEE, 2015.

* cited by examiner

CREDIT CARD AUTO-FILL

CROSS-REFERENCE TO RELATED APPLICATIONS

This disclosure is related to the subject matter of commonly-assigned U.S. patent application Ser. No. 14/292,776, entitled, "Object-of-Interest Detection and Recognition with Split, Full-Resolution Image Processing Pipeline," which was filed on May 30, 2014 ("the '776 application) and commonly-assigned U.S. patent application Ser. No. 14/292,781, entitled, "Systems and Methods for Character Sequence Recognition with no Explicit Segmentation," which was filed on May 30, 2014 ("the '781 application). The '776 application and the '781 application are each hereby incorporated by reference in their entireties.

BACKGROUND

This disclosure relates generally to the field of image processing and, more particularly, to various techniques for perform credit card recognition using electronic devices with integrated cameras.

The advent of portable integrated computing devices has caused a wide-spread proliferation of digital cameras. These integrated computing devices commonly take the form of smartphones or tablets and typically include general purpose computers, cameras, sophisticated user interfaces including touch-sensitive screens, and wireless communications abilities through Wi-Fi, LTE, HSDPA and other cell-based or wireless technologies. The wide proliferation of these integrated devices provides opportunities to use the devices' capabilities to perform tasks that would otherwise require dedicated hardware and software. For example, as noted above, integrated devices such as smartphones and tablets typically have one or two embedded cameras. These cameras comprise lens/camera hardware modules that may be controlled through the general purpose computer using system software and/or downloadable software (e.g., "Apps") and a user interface including, e.g., programmable buttons placed on the touch-sensitive screen and/or "hands-free" controls such as voice controls.

One opportunity for using the features of an integrated device is to capture and evaluate images. The devices' camera(s) allows the capture of one or more images, and the general purpose computer provides processing power to perform analysis. In addition, any analysis that is performed for a network service computer can be facilitated by transmitting the image data or other data to a service computer (e.g., a server, a website, or other network-accessible computer) using the communications capabilities of the device.

These abilities of integrated devices allow for recreational, commercial and transactional uses of images and image analysis. For example, images may be captured and analyzed to decipher information from the images such as characters, symbols, and/or other objects of interest located in the captured images. The characters, symbols, and/or other objects of interest may be transmitted over a network for any useful purpose such as for use in a game, or a database, or as part of a transaction such as a credit card transaction. For these reasons and others, it is useful to enhance the abilities of these integrated devices and other devices for deciphering information from images.

In particular, when trying to read a credit card with a camera, there are multiple challenges that a user may face. Because of the widely-varying distances that the credit card may be from the camera when the user is attempting to read the credit card, one particular challenge is the difficulty in focusing the camera properly on the credit card. Another challenge faced is associated with the difficulties in reading characters with perspective correction, thus forcing the user to hold the card in a parallel plane to the camera to limit any potential perspective distortions. One of the solutions to these problems available today is that the user has to be guided (e.g., via the user interface on the device possessing the camera) to frame the credit card (or other object-of-interest) in a precise location and orientation—usually very close to the camera—so that sufficient image detail may be obtained. This is challenging and often frustrating to the user—and may even result in a more difficult and time-consuming user experience than simply manually typing in the information of interest from the credit card. It would therefore be desirable to have a system that detects the credit card (or other object-of-interest) in three-dimensional space, utilizing scaling and/or perspective correction on the image, thus allowing the user more freedom in how the credit card (or other object-of-interest) may be held in relation to the camera during the detection process.

Another challenge often faced comes from the computational costs of credit card recognition (or other object-of-interest recognition) algorithms, which scale in complexity as the resolution of the camera increases. Therefore, in prior art implementations, the camera is typically running in a low resolution mode, which necessitates the close framing of the card by the user in order for the camera to read sufficient details on the card for the recognition algorithm to work successfully with sufficient regularity. However, placing the card in such a close focus range also makes it more challenging for the camera's autofocus functionality to handle the situation correctly. A final shortcoming of prior art optical character recognition (OCR) techniques, such as those used in credit card recognition algorithms, is that they rely on single-character classifiers, which require that the incoming character sequence data be segmented before each individual character may be recognized—a requirement that is difficult—if not impossible—in the credit card recognition context.

The inventors have realized new and non-obvious ways to make it easier for the user's device to detect and/or recognize the credit card (or other object-of-interest) by overcoming one or more of the aforementioned challenges. As used herein, the term "detect" in reference to an object-of-interest refers to an algorithm's ability to determine whether the object-of-interest is present in the scene; whereas the term "recognize" in reference to an object-of-interest refers to an algorithm's ability to extract additional information from a detected object-of-interest in order to identify the detected object-of-interest from among the universe of potential objects-of-interest.

SUMMARY

Some images contain decipherable characters, symbols, or other objects-of-interest that users may desire to detect and/or recognize. For example, some systems may desire to recognize such characters and/or symbols so that they can be directly accessed by a computer in a convenient manner, such as in ASCII format. Some embodiments of this disclosure seek to enhance a computer's ability to detect and/or recognize such objects-of-interest in order to gain direct access to characters or symbols visibly embodied in images. Further, by using an integrated device, such as a smartphone, tablet or other computing device having an embedded camera(s), a user may capture an image, have the image processed to decipher characters, and use the deciphered information in a transaction.

One example of using an integrated device as described above to detect and/or recognize an object-of-interest is to capture an image of an object having a sequence of characters, such as a typical credit card, business card, receipt, menu, or sign. Some embodiments of this disclosure provide for a user initiating a process on an integrated device by activating an application or by choosing a feature within an application to begin a transaction. Upon this user prompt, the device may display a user interface that allows the user to initiate an image capture or that automatically initiates an image capture, with the subject of the image being of an object having one or more sub-regions comprising sequences of characters that the user wishes to detect, such as the holder name, expiration date, and account number fields on a typical credit card. The sequences of characters may also be comprised of raised or embossed characters, especially in the case of a typical credit card.

Differing embodiments of this disclosure may employ one or all of the several techniques described herein to perform credit card recognition using electronic devices with integrated cameras. According to some embodiments, the credit card recognition process may comprise: obtaining a first representation of a first image, wherein the first representation comprises a first plurality of pixels; identifying a first credit card region within the first representation; extracting a first plurality of sub-regions from within the identified first credit card region, wherein a first sub-region comprises a credit card number, wherein a second sub-region comprises an expiration date, and wherein a third sub-region comprises a card holder name; generating a predicted character sequence for the first, second, and third sub-regions; and validating the predicted character sequences for at least the first, second, and third sub-regions using various credit card-related heuristics, e.g., expected character sequence length, expected character sequence format, and checksums.

Still other embodiments of this disclosure may employ one or all of several techniques to use a "split" image processing pipeline that runs the camera at its full resolution (also referred to herein as "high-resolution"), while feeding scaled-down and cropped versions of the capture image frames to a credit card recognition algorithm. (It is to be understood that, although the techniques described herein will be discussed predominantly in the context of a credit card detector and recognition algorithm, the split image processing pipeline techniques described herein could be applied equally to any other object-of-interest for which sufficient detection and/or recognition heuristics may be identified and exploited, e.g., faces, weapons, business cards, human bodies, etc.) Thus, one part of the "split" image processing pipeline described herein may run the credit card recognition algorithm on scaled down (also referred to herein as "low-resolution") frames from the camera, wherein the scale is determined by the optimum performance of that algorithm. Meanwhile, the second part of the "split" image processing pipeline may run a rectangle detector algorithm (or other object-of interest detector algorithm) with credit card-specific constrains (or other object-of interest-specific constraints) in the background. If the rectangle detector finds a rectangle matching the expected aspect ratio and minimum size of a credit card that can be read, then it may crop the card out of the "high-resolution" camera buffer, perform a perspective correction, and/or scale the rectangle to the desired size needed by the credit card recognition algorithm and then send the scaled, high-resolution representation of the card to the detection algorithm for further processing.

One reason for using the split image processing pipeline to operate on the "high resolution" and "low resolution" representations of the object-of-interest concurrently (rather than using solely the "full" or "high resolution" pipeline) is that there are known failure cases associated with object-of-interest detector algorithms (e.g., rectangle detector algorithms). Examples of failure cases include: 1.) The user holding the credit card too close to the camera, resulting in some edges being outside the frame. This may fail in the rectangle detector (i.e., not enough edges located to be reliably identified as a valid rectangle shape) but work fine in the direct path of feeding the "low-resolution" version of the image directly to the credit card recognition engine. 2.) Some particular kinds of credit cards or lighting and background scenarios will make it very difficult for the edge detector portion of the rectangle detector to reliably identify the boundaries of the credit card. In this second case, the user would likely be instructed to attempt to frame the card very closely to the camera, so that the credit card recognition engine alone can read the character sequences of the card. In some embodiments, if no valid credit card has been found by the rectangle detector after a predetermined amount of time, the user interface (UI) on the device may be employed to "guide" the user to frame the card closely.

Advantages of this split image processing pipeline approach to object-of-interest recognition include the ability of the user to hold the card more freely when the camera is attempting to detect the card and read the character sequences (as opposed to forcing the user to hold the card at a particular distance, angle, orientation, etc.). The techniques described herein also give the user better ability to move the credit card around in order to avoid specular reflections (e.g., reflections off of holograms or other shiny card surfaces). In most cases, the credit card will also be read earlier than in the prior art approaches in use today.

Still other embodiments of this disclosure may be employed to perform character sequence recognition with no explicit character segmentation. According to some such embodiments, the character sequence recognition process may comprise generating a predicted character sequence for a first representation of a first image comprising a first plurality of pixels by: sliding a well-trained single-character classifier, e.g., a Convolutional Neural Network (CNN), over the first representation of the first image one pixel position at a time until reaching an extent of the first representation of the first image in a first dimension (e.g., image width); recording a likelihood value for each of k potential output classes at each pixel position, wherein one of the k potential output classes comprises a "background class"; determining a sequence of most likely output classes at each pixel position; decoding the sequence by removing identical consecutive output class determinations and background class determinations from the determined sequence; and validating the decoded sequence using one or more predetermined heuristics, such as credit card-related heuristics.

In still other embodiments, the techniques described herein may be implemented as methods, encoded in instructions stored in non-transitory program storage devices, or implemented in apparatuses and/or systems, such as electronic devices having cameras, memory, and/or programmable control devices.

DETAILED DESCRIPTION

Systems, methods and program storage devices are disclosed herein for performing credit card recognition using electronic devices with integrated cameras. The techniques disclosed herein are applicable to any number of electronic devices with displays and cameras, such as: digital cameras, digital video cameras, mobile phones, personal data assistants (PDAs), portable music players, monitors, and, of course, desktop, laptop, and tablet computers.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

It will be appreciated that, in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of image processing systems having the benefit of this disclosure.

Figure 1:
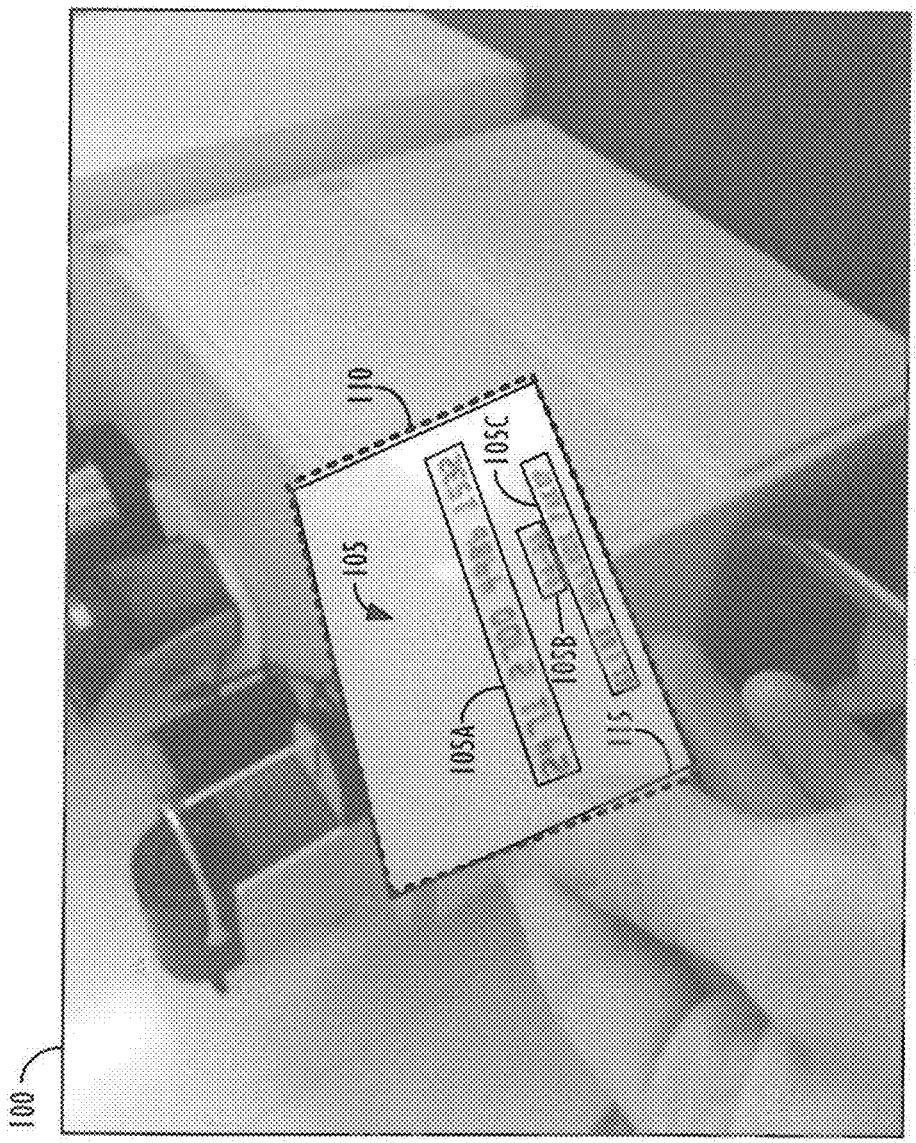
FIG. 1 illustrates the output of a rectangle detector on an exemplary image comprising a representation of a credit card, in accordance with one embodiment.

Referring now to FIG. 1, the output 110/115 of a rectangle detector on an exemplary image 100 comprising a representation of a credit card 105 is illustrated, in accordance with one embodiment. As shown in FIG. 1, the credit card 105 that the system is attempting to detect (and presumably to subsequently read the relevant, credit card-related information from) is being held in the hand of a user at a comfortable distance from the camera, with no user interface guidelines or instructions directing the user where to hold the credit card with respect to the image frame. In the example shown in FIG. 1, credit card 105 comprises three pieces of relevant, credit card-related information that a credit card recognition algorithm would likely want to read: the credit card number 105A, the credit card expiration date 105B, and the credit card holder name 105C. Various challenges associated with detecting and recognizing character sequences in these three canonical credit card information fields will be discussed in further detail below. As is typical, the rectangle detector that has been run on exemplary image 100 has located two potential valid rectangles: rectangle 110 (shown in dashed-line form) and rectangle 115 (shown in solid-line form). The various components of a rectangle detector may be configured to select the best rectangle from among the located rectangle candidates returned by the rectangle detector, as will be discussed in further detail below.

Figure 2:
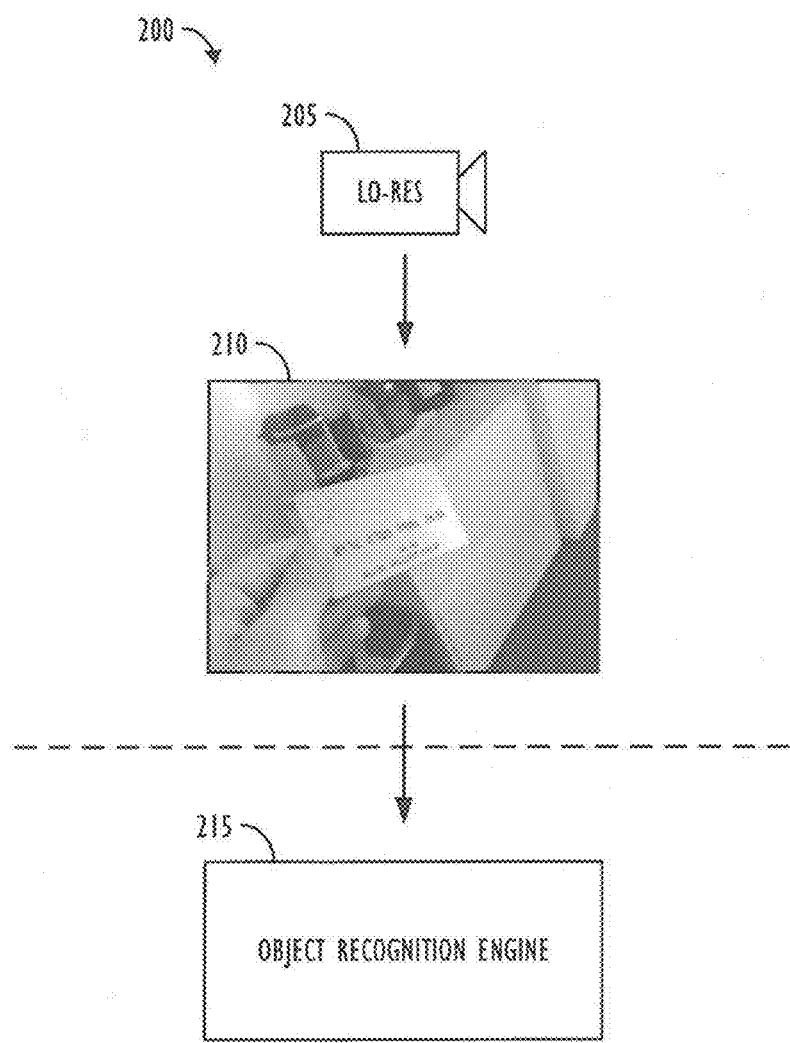
FIG. 2 illustrates a single-path, low-resolution, object-of-interest recognition image processing pipeline, in accordance with the prior art.

Referring now to FIG. 2, a single-path, low-resolution, object-of-interest recognition image processing pipeline 200 is illustrated, in accordance with the prior art. In the exemplary image processing pipeline 200, camera 205 returns an image 210 considered to be "low-resolution." A low-resolution image may comprise, for example, a video frame having a 640 pixel by 480 pixel resolution. The low-resolution image 210 is then simply passed to an object recognition engine 215. In the example shown in FIG. 2, the object-of-interest is a credit card, so the object recognition engine 215 may attempt to identify and read the various information fields on the credit card, such as the credit card number, credit card expiration date, and credit card holder name fields, as discussed above with reference to FIG. 1.

Because the algorithm to identify and read the various information fields on the credit card can be very computationally expensive, in some implementations, there is no computationally feasible choice other than to use low-resolution images (e.g., 640 pixels by 480 pixels) for object-of-interest recognition. Otherwise, there would be too many image pixels to operate on and read the credit card information in real-time off the camera's video stream. Additionally, for most character recognition algorithms, there is a minimum height required for the algorithm to be able to recognize the letters, so the credit card needs to be positioned fairly close to the camera for any implementation operation on low-resolution image data. With the object-of-interest positioned very close to the camera, i.e., in the macro-focus range, the camera's lens moves very little, so the depth of field is very shallow. This makes it difficult for the camera to achieve proper focus. The farther away the object-of-interest is from the camera, the less the camera has to move to achieve proper focus. As will be discussed below, this provides further motivation for the split image processing pipeline to be run concurrently in both low-resolution and high-resolution modes.

Figure 3:
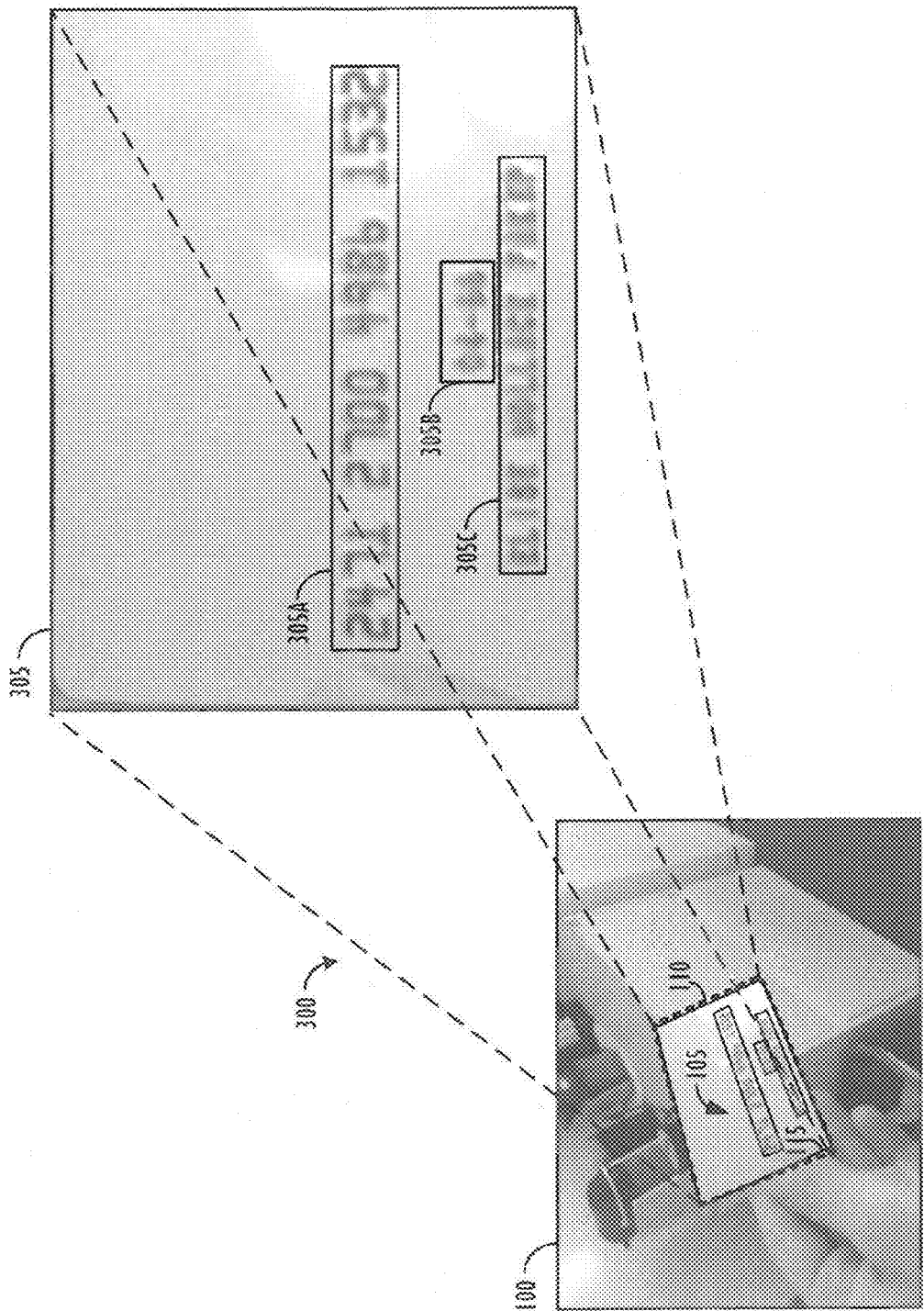
FIG. 3 illustrates an example of a cropped, perspective corrected, and scaled object-of-interest comprising a representation of a credit card, in accordance with one embodiment.

Referring now to FIG. 3, an example of a cropped, perspective corrected, and scaled object-of-interest comprising a representation of a credit card is illustrated, in accordance with one embodiment. As discussed above with reference to FIG. 1, image 100 has been analyzed, and potential rectangles 110 and 115 have been detected by a rectangle detector tuned to detect typical credit card shapes. For the sake of example, rectangle 110 has been chosen in FIG. 3 as the best rectangle candidate in image 100. Located rectangle 110 has been cropped from image 100, and each of its corners have been perspective corrected via process 300, resulting in scaled, cropped, and perspective-corrected representation 305 of credit card 105. As may now be seen more clearly, the various credit card information fields, i.e., credit card number 305A, the credit card expiration date 305B, and the credit card holder name 305C, are now likewise scaled to larger heights, straightened into a horizontal row of characters, and at a higher resolution (since they have been cropped from the full-resolution image frame 100. According to some embodiments, the act of perspective correction may be performed by calls to existing image processing code modules, such as a CORE IMAGE filter, provided by APPLE INC. According to other embodiments, the resulting scaled, cropped, and perspective-corrected representation 305 of credit card 105 may be scaled to the same size of the low-resolution image frame (e.g., 640 pixels by 480 pixels), so that the object-of-interest recognition algorithm may be run identically on the frames provided by both the low-resolution and high-resolution paths of the split image processing pipeline. As may now be more clearly understood, in the case of the high-resolution path, the object-of-interest, i.e., credit card, will take up the entire extent of the 640 pixel by 480 pixel image frame, whereas, in the case of the low-resolution path, the extent of the 640 pixel by 480 pixel image frame taken up by the object-of-interest will be determined by how closely the user was holding the object-of-interest to the camera at the time of capture. (In some embodiments, it has been empirically determined that the object-of-interest should comprise at least 20% of the extent of the larger dimension of the image frame to have a realistic probability of successful object-of-interest recognition.) Thus, it may be expected that the high-resolution path may lead to higher quality recognition results in many scenarios, e.g., scenarios in which the user is not holding the object-of-interest very close to the camera.

Figure 4:
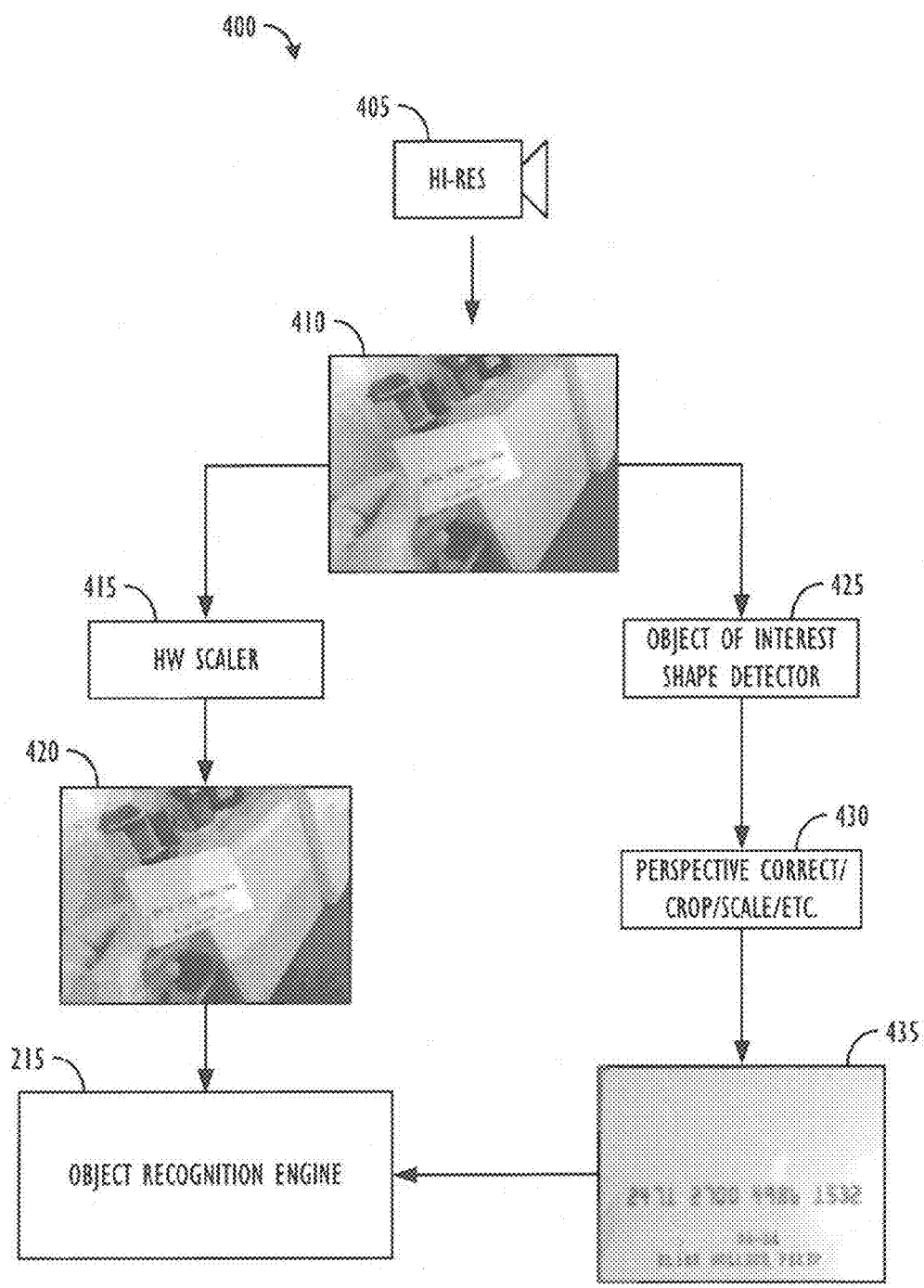
FIG. 4 illustrates a split path, high resolution, object-of-interest detection and recognition image processing pipeline, in accordance with one embodiment.

Referring now to FIG. 4, a split path, high resolution, object-of-interest detection and recognition image processing pipeline 400 is illustrated, in accordance with one embodiment. In the exemplary image processing pipeline 400, camera 405 returns a full resolution image 410 considered to be "high-resolution." A high-resolution image may comprise, for example, a video frame having a 3,264 pixel by 2,448 pixel resolution (i.e., 8 megapixels) or a 2,592 pixel by 1,936 pixel resolution (i.e., 5 megapixels). The high-resolution image 410 is then concurrently processed on both the high-resolution and low-resolution paths of the split image processing pipeline. In the example shown in FIG. 4, the low-resolution path begins by scaling the full resolution image 410 to a more manageable low-resolution size, e.g., 640 pixels by 480 pixels. In some embodiments, this scaling may be performed by hardware scaler 415, such as a memory-to-memory (i.e., "M2M") scaler, resulting in low resolution image 420. In other embodiments, scaler 415 may also be implemented in software or performed by a graphics processing unit (GPU). Low-resolution image 420 may then be passed to object recognition engine 215, which, as discussed above with reference to FIG. 2, may attempt to identify and read the various information fields on the credit card, such as the credit card number, credit card expiration date, and credit card holder name fields.

With respect to the high-resolution path, an object-of-interest detector 425 may be run on the full resolution image 410. According to some embodiments, object-of-interest detector 425 may comprise a rectangle detector, as will be described in greater detail with reference to FIG. 5. Once the most likely object-of-interest candidate has been detected by object-of-interest detector 425, the high-resolution path may proceed to crop, perspective correct, and scale the detected object-of-interest (block 430), resulting in a well-aligned, appropriately-sized, high-resolution image 435, consisting of only the object-of-interest cropped out of the original full resolution image 410. High-resolution image 435 may then also be passed to object recognition engine 215 in order to attempt to identify and read the various information fields on the credit card, such as the credit card number, credit card expiration date, and credit card holder name fields. Because the image data from the two paths of the split image processing pipeline may reach the object recognition engine 215 at different times, according to some embodiments, the first image that is evaluated as having a quality metric exceeding a first quality threshold value may be selected to have its recognized information returned to the requesting process.

According to some embodiments, the split image processing pipeline may be implemented in an electronic device having a multi-core architecture. In particular, each of the pipelines may run on a different core.

Figure 5:
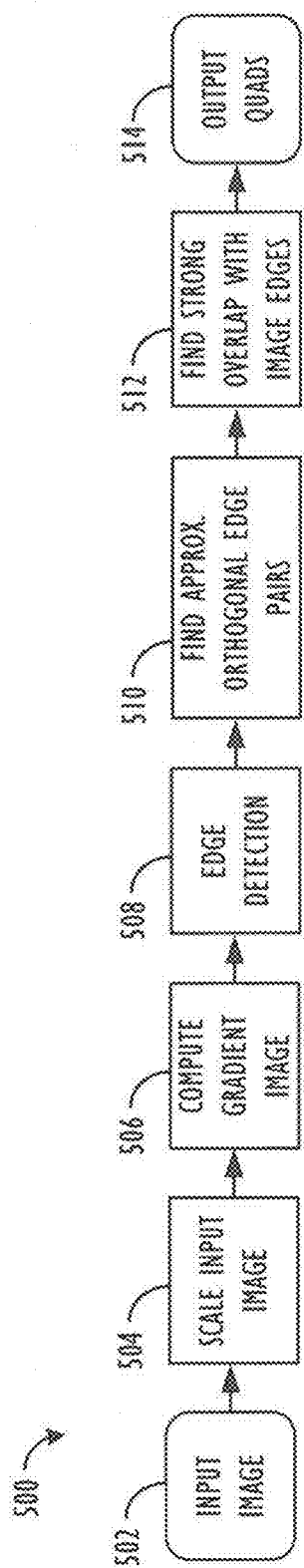
FIG. 5 illustrates an exemplary rectangle detector process in flowchart form, in accordance with one embodiment.

Referring now to FIG. 5, an exemplary rectangle detector process 500 is illustrated in flowchart form, in accordance with one embodiment. First, the input image (502) is taken and scaled to an appropriate size (504). According to some embodiments, the image may be scaled down to only 256 pixels by 256 pixels before performing edge detection. Detecting edges at a lower resolution filters out noise from the image. Once the edges have been located, the image data can be scaled back up to full-resolution so that the character recognition process is more likely to be successful.

Next, the process 500 will compute a gradient image (506) and perform a desired edge detection algorithm (508). According to some embodiments, a Canny edge detection process is used, although this is not strictly necessary. Next, the process 500 may find edge pairs that are approximately orthogonal, i.e. nearly perpendicular to each other (510), and generate potential quadrilateral candidates. The potential quadrilateral candidates may then be pruned by size, aspect-ratio, or whatever other object-of-interest heuristics are known to the detector process. The process finally considers the quadrilateral candidates in conjunction with the edge detection information to find areas of strong overlap with image edges (512), which serves as a final check in the process's determination of the strongest quadrilateral candidates to output to the requesting process (514).

Many variants to the rectangle detector process described with reference to FIG. 5 may be employed, and other detectors may also be employed for shapes other than rectangles, such as squares, circles, human faces, etc. In particular, according to some embodiments disclosed herein, the rectangle detector is taking advantage of the known aspect ratio of the credit card, while dealing with perspective distortion, noise, background objects, patterns on the credit cards themselves, motion blur (e.g., due to motion of the camera, the motion of the hand holding the card, or both) and occlusion of edges (in the hand-held credit card case), etc.

Figure 6:
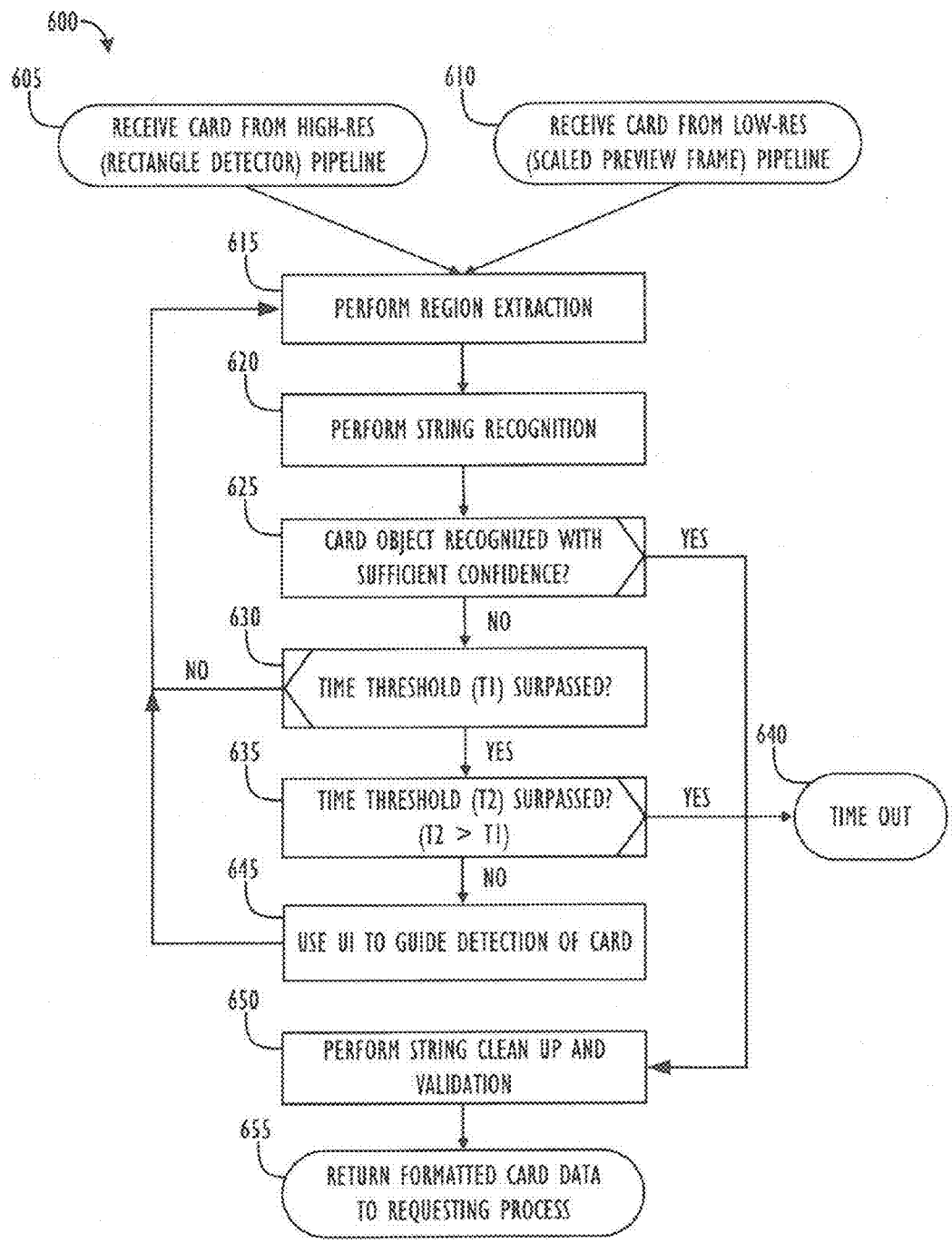
FIG. 6 illustrates an exemplary credit card recognition process in flowchart form, in accordance with one embodiment.

Referring now to FIG. 6, an exemplary credit card recognition process 600 is illustrated in flowchart form, in accordance with one embodiment. First, as described above, the process may receive a representation of a credit card (or other object-of-interest) from both the high-resolution path of the split image processing pipeline (i.e., the path where the rectangle detector has been used to crop and scale only the representation of the credit card out from the high-resolution of the captured image) (Step 605), as well as from the low-resolution path of the split image processing pipeline (i.e., the path where the scaled preview frame has been sent directly to the object-of-interest recognition algorithm) (Step 610).

As the object-of-interest recognition algorithm is receiving image frames concurrently from each path of the split path image processing pipeline (e.g., in different threads and/or on different cores), it will perform region extraction (Step 615) and string recognition techniques (Step 620) in real-time on each stream of incoming image frames and compare the quality of the recognized objects-of-interest in the incoming images to established quality metrics in order to determine whether an object-of-interest has been recognized with sufficient confidence (Step 625). In some embodiments, determining whether the object-of-interest has been recognized with sufficient confidence comprises determining whether the quality metric exceeds a first quality threshold value. The region extraction (Step 615) and string recognition (Step 620) steps will be described in further detail below.

In some embodiments, determining whether there is an object-of-interest representation present in the incoming image with sufficient confidence may involve reliance on the object-of-interest recognition algorithm, as well as other object-of-interest-related heuristics. For example, in the case of credit cards, checksums may be used to validate that the process is getting back a valid card number from the recognition engine. The checksum, as provided by ISO/IEC-7811 Part 1, uses a set of mathematical equations to involving each of the digits in the credit card number (other than the last digit) in order to set the last digit of the credit card number. Thus, if any recognized digit in the credit card number is wrong, the checksum will not equal the correct number for the last digit of the credit card number. When the object-of-interest is a credit card, checks may also be done against the prefix of the credit card number to determine whether the prefix represents a valid prefix for a major credit card vendor (e.g., American Express, MasterCard, VISA, etc.). Other high-level filtering heuristics may also be used, such as the potential character classes the CNN or other single-character classifier should recognize in the incoming image. In one embodiment, the only valid character classes are the numbers 0-9 and a "background" class, as will be described in further detail below. In the case of credit card holder names, the characters A-Z may also be valid character classes. Because image backgrounds are often quite complex, numbers may be clipped incorrectly, e.g., a '9' might appear to be a '1' if the region around the credit card number field is extracted incorrectly. If an object-of-interest passes each of these object-of-interest-related constraints, the process may have sufficient confidence that it has detected a valid object-of-interest and proceed to Step 650 to perform string clean up and validation and, finally, return the formatted and validated credit card data to the requesting process (Step 655). According to some embodiments, the credit card should be extracted at a resolution high enough that the credit card number, expiration date and card holder name images can be extracted at minimum pixel height in a first dimension, e.g., 28 pixels in height.

In some embodiments, the process 600 will use the first image frame passed to it that has a sufficient confidence score—whether it came from the high-resolution path or the low-resolution path. If, at Step 625, no object-of-interest representation is recognized with sufficient confidence after a first predetermined amount of time, t1, has passed (but before a second predetermined amount of time, t2, has passed, wherein t2>t1), the process may proceed to use the UI on the display of the camera-enabled device to guide the user's placement of the credit card with respect to the camera in order to lead to a higher likelihood of detection with sufficient confidence (Step 645). Once an object-of-interest representation is recognized with sufficient confidence, the process will proceed to Step 650 to perform string clean up and validation. If no object-of-interest representation may be recognized with sufficient confidence after a second predetermined amount of time, t2, has passed (Step 635)—even after using the UI to guide the user's placement of the credit card—the process may time out and exit (Step 640) and inform the user to try again later, perhaps under different lighting conditions or against a different background. Additionally, or alternatively, a user may be informed of known suboptimal conditionals without requiring a timeout. For example, low-lighting conditions could be detected and reported to the user before a full timeout occurred.

Region Extraction (Step 615)

The credit card number region may be extracted from the incoming credit card image based on the ISO/IEC-7811 Part 1 standard, which specifies the embossed regions of the credit card (Step 615). In one embodiment, a full cut of the credit card identification region is passed to the card object recognition engine 215, which will attempt to recognize the region as a credit card number. The object recognition engine 215 may then provide potential 15- and 16-digit results back to the process 600, which results may then be evaluated to determine whether they represent a valid credit card number, e.g., using Luhn checksums, as well as a prefix verification that checks to ensure that the first digit(s) of the credit card number are not outside the range of expected banking institutions.

If a valid credit card number is found, further card regions may be examined to attempt to find a valid card expiration date and card holder name. The second embossed region from ISO/IEC-7811 Part 1 specifies a name and address area. This area may be extracted, and a series of cuts made based on a set of probable locations given from a variety of genuine cards. For example, expiration dates are expected to be in one of two general formats: either day-month-and-year or just month-and-year. "Wide" and "narrow" regions may then be cut in the expected date locations and passed to the object recognition engine 215. Due to the variability of the overall credit card cut itself, several vertical offsets—as well as cuts of varying widths—may be made to attempt to cover cases where the date lies slightly above, below, or beyond the expected regions. Once a valid date is found, it may be saved, and the extraction process may proceed to attempt to find cardholder name is made.

For the card holder name field, full lines from the address area are passed to the engine also using half-line increments to handle cardholder name appearing in between image lines. Once a valid name is found it is returned and results are returned to the user. If cardholder name or expiration date regions are not found, the system makes several more attempts through the whole pipeline to try to recover cardholder name and expiration date. If both are still not found whatever results are found on the final frame are returned to the user.

String Recognition (Step 620)

Once a region of interest containing a credit card number, an expiration date or a cardholder name is isolated, the resulting image may be sent to the string recognition portion of the object recognition engine 215 (Step 620). According to some embodiments, the object recognition engine 215 takes an image as its input and returns a list of possible character label sequences. As will be discussed in further detail below, the string recognizer is designed to work without any a priori knowledge of the length of the label sequence, but, if known a priori, may also be used to produce a character label sequence of a given character length.

For each of the three fields, i.e., credit card number, expiration date, and cardholder name, an independent single character classifier may be pretrained before the classifier is put into use. According to some embodiments, a Convolutional Neural Network (CNN) with one output for each symbol in the alphabet (plus an additional "background class") is used for this task. Instead of trying to explicitly segment the character string into individual characters and recognize potential character candidates one at a time, according to some embodiments described herein, the CNN classifier slides over the whole image, pixel by pixel, and the best-matching character sequence may be extracted from the resulting collection of activations. The resulting collection of activation probabilities at each pixel position in the image will also be referred to herein as the "activation lattice." When creating the activation lattice, the CNN recognizes the correct character class when it is centered (or nearly-centered) over it, and predicts the "background class" when positioned over parts of the background image falling in between valid characters. As may now be more fully appreciated, by utilizing the novel "background class" concept, the character string may be recognized without performing explicit a priori segmentation.

As will be discussed further with reference to FIGS. 9A and 9B, sliding a single-character CNN classifier over the input image may result in a noisy activation lattice, from which extracting the correct label sequence may prove difficult and error-prone. The pre-trained single-character recognizer may therefore be adapted over a training set consisting of a collection of images with corresponding label sequences. Training the character recognizer may comprise changing the CNN's parameters such that the predicted character string matches the label sequence. This type of sequence training ensures that the optimization criterion is better aligned with the task at hand, which is to recognize a string of several characters. As compared to the pre-trained CNN, extracting the correct character label sequence from the trained CNN's activation lattice is more accurate and more robust.

As will be understood, the character classifiers may also be customized for the particular credit card information fields that they are operating on:

Credit card number: The alphabet for the credit card number recognizer may consist of the ten digits (i.e., 0-9), and the string recognizer may return two possible label sequences—one with 15 digits and one with 16 digits (since both sequence lengths are supported by different credit card vendors). Then, the potential credit card number sequence that passes the aforementioned checksum tests may be selected as the most likely credit card number character sequence.

Expiration date: The alphabet for the expiration date recognizer may consist of nineteen uppercase letters (i.e., those that are used in the various month abbreviations), ten digits (i.e., 0-9) and three special characters (i.e., the period, dash, and forward slash). Because expiration dates on credit cards have two common formats, i.e., those of length five and those of length eight, the expiration date recognizer may return label sequences of both length five and length eight, with the date sequence more strongly matching a tailored regular expression search and/or an expected date format being selected as the most likely expiration date character sequence.

Card holder name: The alphabet for the card holder name recognizer may consist of twenty-six uppercase letters (i.e., A-Z), six special characters (e.g., hyphens, periods, commas, forward slashes, apostrophes, and ampersands), and a space. Cardholder names have no fixed length, and the name recognizer therefore returns the most likely sequence for this task.

For all three tasks, training data may be extracted from annotated credit cards. For the single-character classifier, single characters and the corresponding labels may be extracted. For the sequence training phase, images of the entire strings with the sequence labels are required.

String Clean Up and Validation (Step 650)

Signals returned from the object recognition engine 215 are often noisy and include additional or incorrect information, so to improve results, fields may be validated before being returned to the user (Step 650).

For example, expiration dates returned from the object recognition engine 215 can appear in several different formats/styles: dd.mm.yy; dd/mm/yy; dd-mm-yy; mm/yy; mm.yy; mm-yy; and mm/yy. In some embodiments, the recognized expiration dates are only returned if they match, e.g., by a regular expression search, one of these expected date formats.

Names often come back very close (but not exact) to the expected names, so, according to some embodiments, a post-processing step of searching a user's "Address Book" application (or similar database directory of known, i.e., valid, contacts) may be employed in order to find the closest edit-distance match in the Address Book to the recognized card holder name string. In this context, valid character strings refer to strings for which there is a particular reason or confirmation from an authoritative third party source that the string in question is, in fact, a valid string for the relevant context (e.g., a name may be pre-validated by appearing in a user's Address Book application, and a word or sequence of characters may be identified as valid by virtue of appearing in a language model of a language of interest). If the match between the predicted card holder name string and the Address Book entry is sufficient close, some embodiments may replace the recognized card holder name string with the closest match from the Address Book or similar application. Multiple checks may be made, as names appearing on credit cards sometimes include middle names, prefixes (e.g., Mr., Mrs., Dr., etc.), abbreviations, etc.—and sometimes they do not.

Some embodiments may additionally employ support for what will be referred to herein as a "language model." Utilizing such a language model, the string validation process may analyze the distribution of characters and leverage knowledge from the language model regarding how likely certain characters are to follow other characters. Language models may be established by first examining a large corpus of valid and relevant names and then computing models, which may later be used to provide a confidence measure as to whether a recognized string is or is not likely a name—even if it's not in the user's Address Book. Incorporating the language model during the decoding phase may potentially help the CNN classification engine recover from ambiguous or low-confidence activations. Such incorporation may be done in various ways, e.g., lattice rescoring, simple score weighting, or more sophisticated integration into the recognition engine. Common linguistics techniques, such as those employed in handwriting/drawing recognition engines may be employed to leverage a character's surrounding context in order to help disambiguate the true identity of characters. Thus, the character recognition scores from the object recognition engine 215 may be intelligently combined with the language model scores to enhance the string validation portion of the object recognition engine 215.

Convolutional Neural Networks (CNNs)

The ability of multi-layer neural networks trained with gradient descent to learn complex, high-dimensional, non-linear mappings from large collections of examples make them good candidates for image recognition tasks. A trainer classifier (normally, a standard, fully-connected multi-layer neural network can be used as a classifier) categorizes the resulting feature vectors into classes. However, it could have some problems that may influence the character recognition results. The convolution neural network solves this shortcoming of traditional classifiers to achieve improved performance on pattern recognition tasks.

The CNN is a special form of multi-layer neural network. Like other networks, CNNs are trained by back propagation algorithms. The difference is that the convolutional network combines three architectural ideas to ensure some degree of shift, scale, and distortion invariance: local receptive field, shared weights (or weight replication), and spatial or temporal sub-sampling. CNNs have been designed especially to recognize patterns directly from digital images with a minimum of pre-processing operations. The preprocessing and classification modules are within a single integrated scheme.

A typical convolutional neural network may consist of a set of several layers. The values of the feature maps for each layer are computed by convolving the input layer with the respective kernel and applying an activation function to get the results. Each convolution layer may be followed by a sub-sampling layer, which reduces the dimension of the respective convolution layer's feature maps by a constant factor. The layers of the neural network may be viewed as a trainable feature extractor. Then, a trainable classifier may be added to the feature extractor, in the form of various fully-connected layers (i.e., a universal classifier).

Figure 7:
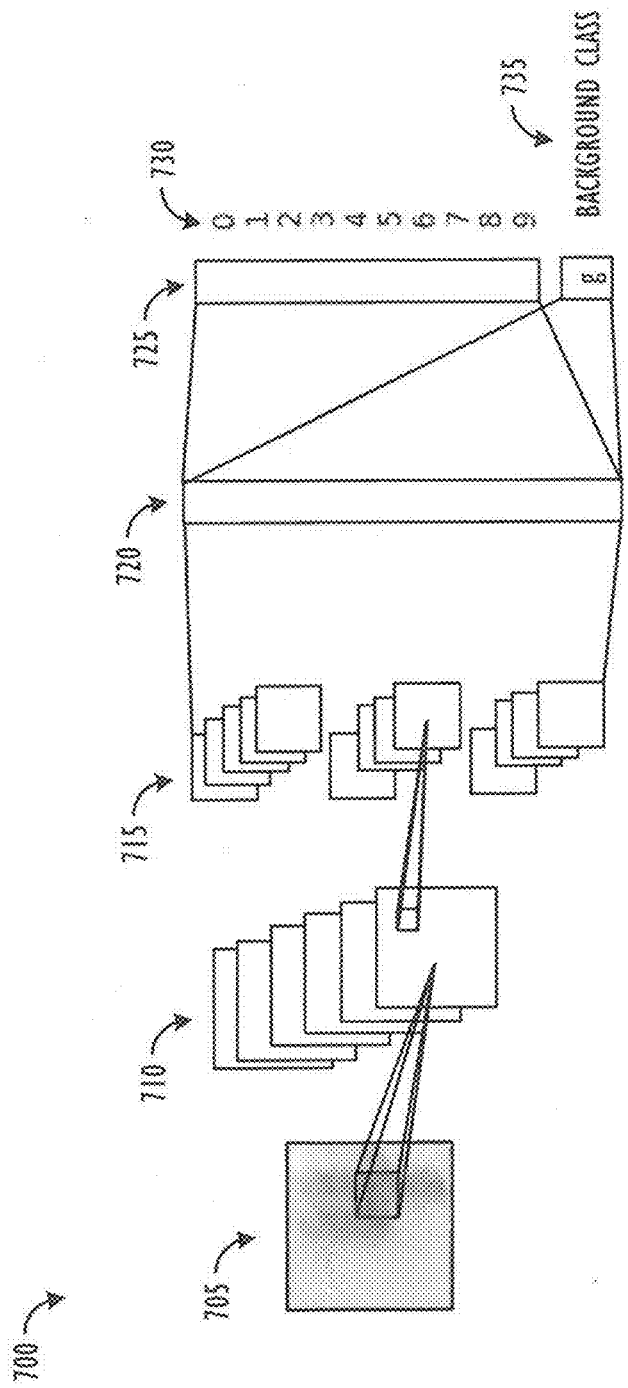
FIG. 7 illustrates an exemplary convolutional neural network (CNN), in accordance with one embodiment.

Referring now to FIG. 7, an exemplary convolutional neural network (CNN) 700 is illustrated, in accordance with one embodiment. According to this exemplary CNN, the model extracts simple feature maps at a higher resolution, and then converts them into more complex feature maps at a coarser resolution by sub-sampling a layer, e.g., by a factor of two. After two layers of convolution and subsampling, the resulting feature map is too small for a third layer of convolution. Thus, the first two layers of this neural network can be viewed as a trainable feature extractor. Then, a trainable classifier is added to the feature extractor, in the form of two fully-connected layers (i.e., a universal classifier). Finally, the weights for each layer may be updated via the process of back propagation, which may begin with the last layer and move backwards through the layers until the first layer is reached.

As shown in FIG. 7, input layer 705 comprises a '4' character, e.g., as read from an exemplary credit card. The input layer 705 may undergo convolution sub-sampling, resulting in a first plurality of smaller feature maps 710. Each of these smaller feature maps 710 may undergo a second round of convolution sub-sampling, resulting in a second plurality of yet smaller feature maps 715. These features may then be combined with a trainable classifier and used as a universal classifier, i.e., a set of fully connected neurons 720. The universal classifier may be used to generate an output layer 725 by classifying incoming characters into one of the potential output classes 730 (in one embodiment, the output classes comprise 0-9) or a "background" class 735. As will be understood, FIG. 7 is merely exemplary, and represents just one embodiment of a possible CNN that may be used to classify incoming characters. The various parameters and layers may be adjusted to fit a particular implementation.

Character Sequence Recognition With No Explicit Segmentation

In recent years, focus in research and industry has been on developing and employing powerful machine learning techniques that are applied to optical character recognition (OCR) problems, where a grayscale image is assigned to one out of k predefined output classes. Many benchmarks are most successfully solved with CNNs (and variants thereof) that use raw pixel intensities as their inputs.

A common shortcoming of such single-character classifiers is that sequences need to be segmented before each individual character may be recognized. As a consequence, the success of such a sequence classifier relies on good character segmentation. Using standard image processing techniques (e.g., binarization and connected component analysis) only works for images with a relatively uniform background. For OCR in natural images, often characterized by highly-varying backgrounds, it is almost impossible to obtain a good segmentation. For these scenarios, a successful algorithm not only needs to classify segmented characters—but also has to learn the segmentation. Various techniques have been used to attempt to solve this problem, e.g., over-segmentation, or using recurrent neural networks (RNNs) that learn to classify sequences from input images. Both approaches have drawbacks, to which the inventors have discovered novel and non-obvious solutions.

Figure 8:
FIG. 8 illustrates an exemplary digit sequence in a natural image, in accordance with one embodiment.
Figure 8:

Thus, disclosed herein are systems and methods that adapt to varying backgrounds and varying character spacings without substantially degrading the classification accuracy of character sequences in natural images. Referring now to FIG. 8, an exemplary digit sequence in a natural image 800 is illustrated, in accordance with one embodiment. In this example, the image has the sequence "523" across several different noisy backgrounds and with several intervening non-character features interspersed with the characters. As will be discussed below with respect to FIGS. 9A and 9B, a sliding, pretrained CNN window may be used to construct activation lattice(s) that may be "decoded" to extract a character sequence from the natural image without performing segmentation.

Figures 9A, 9B:
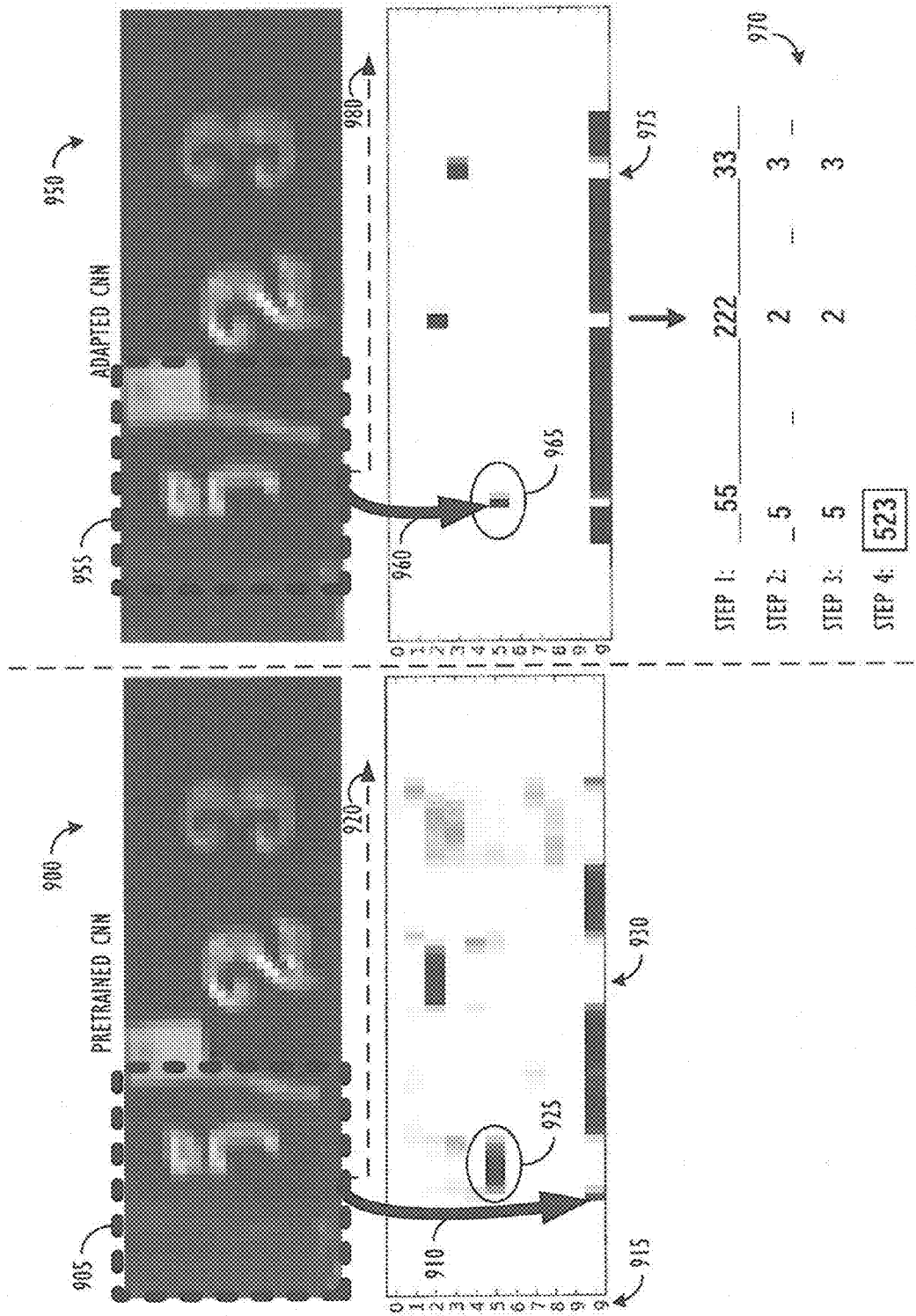
FIG. 9A illustrates an exemplary activation lattice using a pre-trained CNN, in accordance with one embodiment.
FIG. 9B illustrates an exemplary activation lattice using an adapted CNN and a decoded character sequence, in accordance with one embodiment.

Instead of explicitly trying to segment and recognize potential candidates, according to some embodiments described herein, a CNN slides over the whole image, pixel-by-pixel, and the best matching character sequence may be extracted from the resulting collection of activations, referred to herein as the "activation lattice." Each column in this lattice (see, e.g., activation lattice 930 in FIG. 9A and activation lattice 975 in FIG. 9B) corresponds to the activations of a CNN centered at this pixel in the input image (see, e.g., input image 900 in FIG. 9A and input image 950 in FIG. 9B). The CNN outputs may then be normalized, e.g., with a softmax activation function, to be between 0 (white) and 1 (black) (and sum to unity), and can be interpreted as posterior class probabilities of the input image belonging to class k. Each row corresponds to the activations of the $k^{th}$ class across the image. In FIGS. 9A and 9B, activations in each row 915 correspond to digits (0 to 9 from top to bottom) and an additional background class, 'g' (bottom row).

Sliding a pretrained digit classifier 905/955 over the input image (e.g., along the path of arrows 920/980 in FIGS. 9A and 9B) results in a noisy activation lattice (see, e.g., activation lattice 930 in FIG. 9A). Arrows 910/960 illustrate the correspondence between the position of the classifiers 905/955 and their corresponding activations 925/965 in the activation lattices 930/975, respectively.

Thus, as may now be better appreciated, obtaining the correct label sequence "523" from this activation lattice may prove difficult and error-prone. In particular, the labels "5" and "2" are likely to be extract successfully, but the label "3" is likely to be missed (as evidenced by the lack of a defined activation position under the "3" digit in activation lattice 930). Furthermore, due to relatively high activations for different classes at various positions throughout the image, an additional wrong label is very likely to be included in any prediction derived from the activation lattice 930.

One goal of this process is to obtain an activation lattice from which the correct sequence is extracted consistently, with high accuracy, and without knowing the string length a priori. To this end, according to some embodiments, the pretrained CNN may be trained over a "training set," i.e., a collection of images with corresponding label sequences, and then back propagating the sequence errors through a Connectionist Temporal Classification layer (CTC)—without ever having to segment the sequence explicitly.

As opposed to the pretrained CNN shown in FIG. 9A, extracting the correct label "523" from the trained CNN's activation lattice is more accurate and more robust (see activation lattice 975 in FIG. 9B). Furthermore, the trained CNN learned to predict the background class 'g,' for all but the regions that coincide with the digits "5," "2," and "3"—making any explicit segmentation unnecessary.

Compared with prior art solutions, this approach benefits from all advantages of CTC training. Furthermore, this approach results in gained efficiencies—not only because a more efficient CNN is used instead of notoriously difficult to train RNNs, but also because the pretrained CNN remedies the slow convergence seen with conventional CTC training.

Turning now to a preferred embodiment of the CNN classification without explicit segmentation process, a pretrained CNN with k+1 output classes, i.e., one output for each symbol in the alphabet plus an additional "background class," is created. For the sake of explanation, it will be assumed that the image containing the sequence to be classified is horizontally aligned, with its shorter, i.e., vertical, dimension equal to the height of the CNN's receptive field. As shown in FIGS. 9A and 9B, the height of the CNN's receptive field 905/955 is equal to the vertical dimension of the natural image with the "523" number sequence in it. In cases where a broader cut is made from the incoming image, the incoming image may be scaled to ensure that its height is at the predetermined fixed size (e.g., a height of 28 pixels and a width that covers full image). Scaling of the image is permissible because the CNN can be made resilient to scaling issues as it is trained. Alternatively, if the image is not scaled, the classifier could be shifted vertically, with the activation likelihoods summed (or averaged) over the vertical extent of the image at each pixel position.

Sliding the pretrained CNN from left to right over the input image (e.g., along the path of arrows 920/980 in FIGS. 9A and 9B) and recording the activations at every pixel position, p, results in the activation lattice, $y_k^p$, i.e., the posterior class probability of a window centered at pixel p belonging to class k. The conditional probability of any path σ of length P through the activation lattice given an input image x is:

$$p(\sigma | x) = \prod_{p=0}^{P-1} y_{\sigma_p}^p. \quad (1)$$

The conditional probability of any sequence s of length S≤P, given an input image x is:

$$p(s | x) = \sum_{\sigma \in \Omega} p(\sigma | x), \quad (2)$$

where Ω is the set of all paths σ of length P that result in the identical sequence s after removing repetitive labels and the background class. The goal, then, as in standard neural network training, is to maximize equation 2 over a training set T={$x_i$, $s_i$}. The adaptation of the pretrained CNN is then performed using stochastic gradient descent may proceeds in the following way:

1. Randomly pick an image xi with the corresponding label sequence xi from the training set T.
2. Compute the derivative of equation 2 with respect to the network outputs $y_k^p$.
3. Back propagate the error signal through the network and perform a weight update.
4. Repeat Steps 1-3 above until reaching convergence. (Convergence is reached when any further change in the model parameters will no longer meaningfully impact recognition accuracy.)

Referring again to FIG. 9A, an exemplary activation lattice 930 using a pre-trained CNN is illustrated, in accordance with one embodiment. FIG. 9A depicts an activation lattice that would be created with a CNN that recognized the characters "5," "2," and "3." The area in the activation lattice 930 corresponding to the "3" is a bit noisy because the classifier may not have seen a "3" before. If the CNN were then retrained, resulting in the trained CNN of FIG. 9B, the activation lattice 975 would be more likely to show the isolated "blobs" corresponding to the correct character classes, located at the positions in the lattice corresponding to the positions of the characters in the image.

Activation Lattice Decoding

Once the activation lattice has been created for a given input image, it must be decoded to determine which characters (and how many characters total) are in the input image. Different heuristics have been developed by the inventors to find so-called "clusters" of activations within the lattice that may be segmented into a single character, e.g. a "3." Once a region has been located, the process may be iterated until the entire sequence has been traversed.

A naïve approach to activation lattice decoding may simply take the largest activation(s) across the lattice only. However, according to some embodiment disclosed herein, the character sequence as a whole may be analyzed to determine the most likely final result. For example, it is known that valid credit card numbers will have either fifteen or sixteen digits, so, according to some embodiments, the activation energies of consecutive blocks may be summed, and the fifteen (and/or sixteen) largest activation energies may be kept as the decoded fifteen (and/or sixteen)-digit credit card number sequence. [In some embodiments, both fifteen and sixteen digit sequences are checked because it is not always known a priori which vendor's credit card is being read.] Other credit card-related heuristics may also be employed, such as the checksum and vendor-prefix heuristics described above, in order to validate whether the recognized sequence of characters is valid. Similar techniques may be employed with respect to expiration dates, which typically comprise sequences of five or eight characters. With the credit card holder names, the length of the sequence is not known a priori, so different techniques may be employed, such as removing consecutive repetitive activations and backgrounds character classes, as will be discussed in further detail below with reference to FIG. 9B.

Other credit card-related heuristics that may help with the decoding of the activation lattice include the fact that the fixed geometry of embosser machines provides an "expected width" between digits. For example, if it is known that certain characters in the credit card number sequence have center lines that are 2 mm apart, the decoding of the activation lattice may be biased towards strong activations (as would be typical), with the additional requirement that successive activation are located 2 mm apart. This further heuristic may be used to reject certain cases where, e.g., the engine hasn't learned a particular character well yet or where the engine still thinks a particular activation is ambiguous.

Turning back to FIG. 9B, an exemplary a decoded character sequence 970 is shown based on the activation lattice 975. As mentioned above, the CTC retraining process may involve taking the activation lattice output, looking at the likelihoods for each of the potential output classes at each pixel position, and determining a sequence with a length equal to the number of pixels in the image's width. Steps 1-4 in FIG. 9B illustrate the following of the exemplary decoding heuristics outlined above: 1) Repetitive positions are removed; and 2) each time a background class is repeated, it is also removed. For example: at Step 1, the status of the decoded sequence is: "___55___222___33___" (wherein underscores represent a finding of the "background class"). After removing repetitive positions and background classes, at Step 2, the status of the decoded sequence is: "_5_2_3_." After removing the background classes from consideration, at Step 3, the status of the decoded sequence is: "5 2 3." Finally, at Step 4, after removing blank spaces, the decoded sequence is determined to be: "523."

Figure 10:
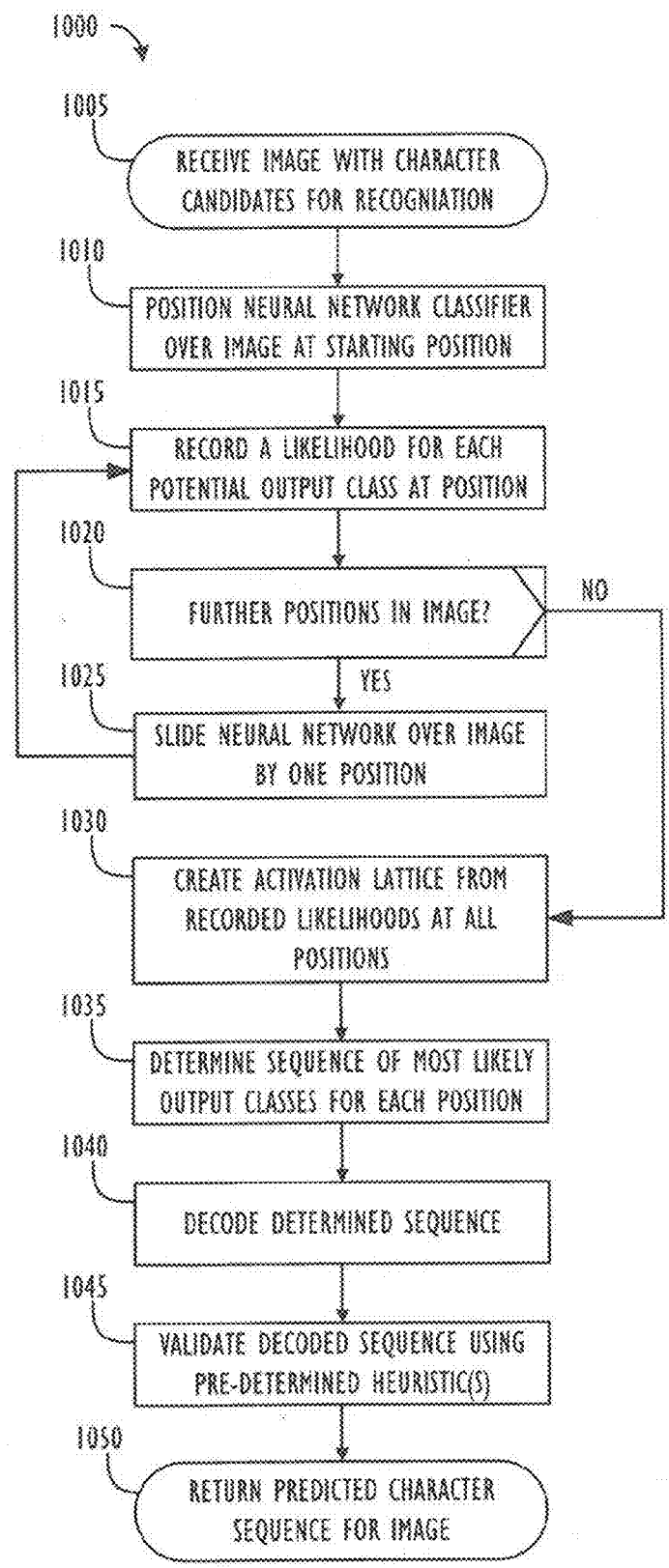
FIG. 10 illustrates an exemplary credit card recognition process using a sliding CNN window in flowchart form, in accordance with one embodiment.

Referring now to FIG. 10, an exemplary credit card recognition process using a sliding CNN window 1000 is summarized at a high-level and illustrated in flowchart form, in accordance with one embodiment. First, the process receives the image with the candidate characters for recognition (Step 1005). Next, the neural network classifier may be placed over the image (after appropriate scaling, if necessary) at a starting position (Step 1010). In some embodiments, the starting position may be the far left of a mainly horizontal image (i.e., an image that is much wider than it is tall), the process may proceed by moving the classifier in a rightward direction across the extent of the image. Next, the process may record a likelihood value for each of k potential output classes at the current position of the neural network classifier over the image (Step 1015). In some embodiments, one of the k potential output classes comprises a "background class." When the various likelihood values (also referred to herein as "activation strengths") have been recorded, the process may determine whether there are further positions in the image for the neural network classifier to be placed over (Step 1020). If there are further positions, the process may slide the neural network classifier over the image by one position, e.g., by one pixel (Step 1025). The process may then proceed by recording the likelihood values at each position across the extent of the image until there are no further positions in the image for the neural network classifier to be placed over ('NO' at Step 1020).

At step 1030, a single "activation lattice" for the image may be created by aggregating all the likelihood values recorded from all the image positions over which the classifier has been evaluated. Next, the process may determine the sequence of most likely output classes for each pixel position (Step 1035). Next, various decoding heuristics, such as those described above, may be employed by the process to decode the sequence of output classes into a single string of output characters likely to correspond to the characters in the input image (Step 1040). A final step may involve validating the decoded sequence using predetermined heuristics, such as expected sequence length, validated string values (e.g., names in an Address Book), known valid sequence prefixes, known accepted string formats, etc. (Step 1045). Finally, the predicted character sequence for the image may be returned to the requesting process (Step 1050).

Figure 11:
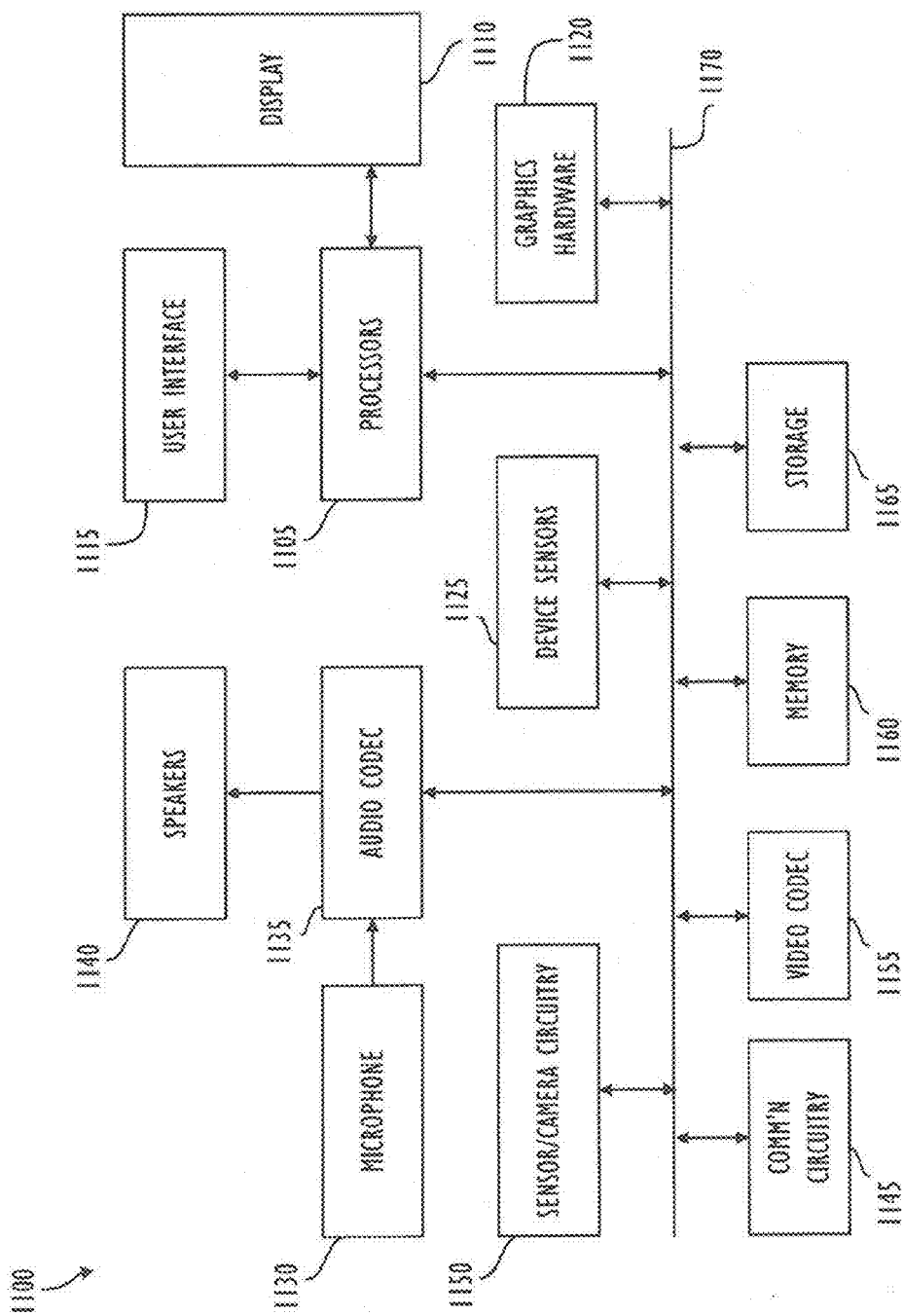
FIG. 11 illustrates a simplified functional block diagram of an illustrative electronic device, according to one embodiment.

Referring now to FIG. 11, a simplified functional block diagram of an illustrative electronic device 1100 is shown according to one embodiment. Electronic device 1100 may include processor 1105, display 1110, user interface 1115, graphics hardware 1120, device sensors 1125 (e.g., proximity sensor/ambient light sensor, accelerometer and/or gyroscope), microphone 1130, audio codec(s) 1135, speaker(s) 1140, communications circuitry 1145, digital image capture unit 1150, video codec(s) 1155, memory 1160, storage 1165, and communications bus 1170. Electronic device 1100 may be, for example, a personal digital assistant (PDA), personal music player, mobile telephone, or a notebook, laptop, or tablet computer system.

Processor 1105 may be any suitable programmable control device capable of executing instructions necessary to carry out or control the operation of the many functions performed by device 1100 (e.g., such as the processing of images in accordance with operations in any one or more of the Figures). Processor 1105 may, for instance, drive display 1110 and receive user input from user interface 1115 which can take a variety of forms, such as a button, keypad, dial, a click wheel, keyboard, display screen and/or a touch screen. Processor 1105 may be a system-on-chip such as those found in mobile devices and include a dedicated graphics processing unit (GPU). Processor 1105 may be based on reduced instruction-set computer (RISC) or complex instruction-set computer (CISC) architectures or any other suitable architecture and may include one or more processing cores. Graphics hardware 1120 may be special purpose computational hardware for processing graphics and/or assisting processor 1105 process graphics information. In one embodiment, graphics hardware 1120 may include one or more programmable graphics processing units (GPUs).

Sensor and camera circuitry 1150 may capture still and video images that may be processed to generate images, at least in part, by video codec(s) 1155 and/or processor 1105 and/or graphics hardware 1120, and/or a dedicated image processing unit incorporated within circuitry 1150. Images so captured may be stored in memory 1160 and/or storage 1165. Memory 1160 may include one or more different types of media used by processor 1105, graphics hardware 1120, and image capture circuitry 1150 to perform device functions. For example, memory 1160 may include memory cache, read-only memory (ROM), and/or random access memory (RAM). Storage 1165 may store media (e.g., audio, image and video files), computer program instructions or software, preference information, device profile information, and any other suitable data. Storage 1165 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1160 and storage 1165 may be used to retain computer program instructions or code organized into one or more modules and written in any desired computer programming language. When executed by, for example, processor 1105, such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable control device and comprising instructions stored thereon to cause one or more processing units to:
obtain a first representation of a first image, wherein the first representation comprises a first plurality of pixels;
identify a first credit card region within the first representation;
extract a plurality of sub-regions from within the identified first credit card region, wherein a first sub-region of the plurality of sub-regions comprises a credit card number, wherein a second sub-region of the plurality of sub-regions comprises an expiration date, and wherein a third sub-region of the plurality of sub-regions comprises a card holder name;
generate a plurality of cuts at a plurality of locations associated with one of the sub-regions when extracting the plurality of sub-regions, wherein a first cut of the plurality of cuts has a different vertical offset and/or a different horizontal offset than another of the plurality of cuts;
generate a predicted character sequence for the first, second, and third sub-regions; and
determine a sequence length of the predicted character sequence for the first sub-region and evaluate a checksum on the predicted character sequence for the first sub-region;
determine a sequence length of the predicted character sequence for the second sub-region and evaluate a format of the predicted character sequence for the second sub-region; and
compare the predicted character sequence for the third sub-region with a plurality of valid character sequences.

2. The non-transitory program storage device of claim 1, wherein the instructions to identify a first credit card region within the first representation further comprise instructions to execute a rectangle detector on the first representation of the first image.

3. The non-transitory program storage device of claim 2, wherein the rectangle detector comprises at least one of: aspect-ratio constraints and size constraints.

4. The non-transitory program storage device of claim 1, wherein the instructions to determine a sequence length of the predicted character sequence for the first sub-region further comprise instructions to determine a sequence length of fifteen or sixteen characters for the predicted character sequence for the first sub-region.

5. The non-transitory program storage device of claim 1, wherein at least one valid character sequence of the predicted character sequence for the first sub-region comprises at least one of the following: a name from an address book; and a character sequence from a language model.

6. The non-transitory program storage device of claim 1, wherein the one of the sub-region is the second sub-region.

7. A system, comprising:
a memory having, stored therein, computer program code;
a digital camera; and
one or more processing units operatively coupled to the digital camera and memory and configured to execute instructions in the computer program code that cause the one or more processing units to:
obtain a first representation of a first image from the digital camera, wherein the first representation comprises a first plurality of pixels;
identify a first credit card region within the first representation;
extract a plurality of sub-regions from within the identified first credit card region, wherein a first sub-region of the plurality of sub-regions comprises a credit card number, wherein a second sub-region of the plurality of sub-regions comprises an expiration date, and wherein a third sub-region of the plurality of sub-regions comprises a card holder name;
generate a plurality of cuts at a set of probable locations associated with one of the sub-regions in order to extract one of the sub-regions, wherein at least some of the plurality of cuts have at least one different vertical offset, horizontal offset, or both than at least some of the plurality of cuts;
generate a predicted character sequence for the first, second, and third sub-regions; and
determine a sequence length of the predicted character sequence for the first sub-region and evaluate a checksum on the predicted character sequence for the first sub-region;
determine a sequence length of the predicted character sequence for the second sub-region and evaluate a format of the predicted character sequence for the second sub-region; and
compare the predicted character sequence for the third sub-region with a plurality of valid character sequences.

8. The system of claim 7, wherein the instructions to identify a first credit card region within the first representation further comprise instructions to execute a rectangle detector on the first representation of the first image.

9. The system of claim 8, wherein the rectangle detector comprises at least one of: aspect-ratio constraints and size constraints.

10. The system of claim 7, wherein the instructions to determine a sequence length of the predicted character sequence for the first sub-region further comprise instructions to determine a sequence length of fifteen or sixteen characters for the predicted character sequence for the first sub-region.

11. The system of claim 7, wherein least one valid character sequence of the predicted character sequence for the first sub-region comprises at least one of the following: a name from an address book; and a character sequence from a language model.

12. The system of claim 7, wherein the one of the sub-region is the second sub-region.

13. A computer-implemented method, comprising:
obtaining a first representation of a first image from a first digital camera, wherein the first representation comprises a first plurality of pixels;
identifying, using a computer, a first credit card region within the first representation;
extracting, using the computer, a plurality of sub-regions from within the identified first credit card region, wherein a first sub-region comprises a credit card number, wherein a second sub-region comprises an expiration date, and wherein a third sub-region comprises a card holder name;
generating, using the computer, a plurality of cuts to extract one of the following regions: the first sub-region of the plurality of sub-regions, the second sub-region of the plurality of sub-regions, or the third sub-region of the plurality of sub-regions, wherein a first cut of the plurality of cuts has a different vertical offset, a horizontal offset, or combination thereof than a second cut of the plurality of cuts;
generating, using the computer, a predicted character sequence for the first, second, and third sub-regions; and
determining, using the computer, a sequence length of the predicted character sequence for the first sub-region and evaluating a checksum on the predicted character sequence for the first sub-region;
determining, using the computer, a sequence length of the predicted character sequence for the second sub-region and evaluating a format of the predicted character sequence for the second sub-region; and
comparing, using the computer, the predicted character sequence for the third sub-region with a plurality of valid character sequences.

14. The computer-implemented method of claim 13, wherein the act of identifying a first credit card region within the first representation further comprises executing a rectangle detector on the first representation of the first image.

15. The computer-implemented method of claim 14, wherein the rectangle detector comprises at least one of: aspect-ratio constraints and size constraints.

16. The computer-implemented method of claim 13, wherein at least the valid character sequence of the predicted character sequence of the first sub-region comprises at least one of the following: a name from an address book; and a character sequence from a language model.

17. The computer-implemented method of claim 13, wherein the plurality of cuts are for the second sub-region.

* * * * *